(12) United States Patent
Geva et al.

(10) Patent No.: US 12,003,874 B2
(45) Date of Patent: *Jun. 4, 2024

(54) IMAGE SENSORS AND SENSING METHODS TO OBTAIN TIME-OF-FLIGHT AND PHASE DETECTION INFORMATION

(71) Applicant: Corephotonics Ltd., Tel Aviv (IL)

(72) Inventors: Nadav Geva, Tel Aviv (IL); Michael Scherer, Tel Aviv (IL); Ephraim Goldenberg, Tel Aviv (IL); Gal Shabtay, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,436

(22) Filed: Aug. 16, 2023

(65) Prior Publication Data

US 2024/0007765 A1    Jan. 4, 2024

Related U.S. Application Data

(63) Continuation of application No. 18/186,151, filed on Mar. 18, 2023, which is a continuation of application
(Continued)

(51) Int. Cl.
*H04N 25/705* (2023.01)
*G06T 7/593* (2017.01)
(Continued)

(52) U.S. Cl.
CPC ........... *H04N 25/705* (2023.01); *G06T 7/593* (2017.01); *H04N 13/207* (2018.05); *H04N 13/271* (2018.05); *H04N 25/75* (2023.01)

(58) Field of Classification Search
CPC .. H04N 13/122; H04N 13/128; H04N 13/207; H04N 13/232; H04N 13/254;
(Continued)

(56) References Cited

U.S. PATENT DOCUMENTS 3,085,354 A    4/1963 Rasmussen et al.
3,584,513 A    6/1971 Gates
(Continued)

FOREIGN PATENT DOCUMENTS

CN    101276415 A    10/2008
CN    201514511 U    6/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Behrooz M Senfi
(74) *Attorney, Agent, or Firm* — Nathan & Associates; Menachem Nathan

(57) ABSTRACT

Indirect time-of-flight (i-ToF) image sensor pixels, i-ToF image sensors including such pixels, stereo cameras including such image sensors, and sensing methods to obtain i-ToF detection and phase detection information using such image sensors and stereo cameras. An i-ToF image sensor pixel may comprise a plurality of sub-pixels, each sub-pixel including a photodiode, a single microlens covering the plurality of sub-pixels and a read-out circuit for extracting i-ToF phase signals of each sub-pixel individually.

20 Claims, 8 Drawing Sheets

Related U.S. Application Data

No. 17/375,299, filed on Jul. 14, 2021, now Pat. No. 11,637,977.

(60) Provisional application No. 63/055,912, filed on Jul. 24, 2020, provisional application No. 63/052,001, filed on Jul. 15, 2020.

(51) Int. Cl.
- *H04N 13/207* (2018.01)
- *H04N 13/271* (2018.01)
- *H04N 25/75* (2023.01)

(58) Field of Classification Search
CPC ......... H04N 13/271; H04N 2013/0081; H04N 25/705; H04N 25/75; G06T 7/593
USPC .......................................................... 348/46
See application file for complete search history.

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 11,637,977 B2 * | 4/2023 | Geva ................... H04N 13/271 348/46 |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0136554 A1 | 9/2002 | Nomura et al. |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0162564 A1 | 8/2003 | Kimura et al. |
| 2003/0202113 A1 | 10/2003 | Yoshikawa |

(56) References Cited

U.S. PATENT DOCUMENTS

| | | |
|---|---|---|
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |

(56) References Cited

U.S. PATENT DOCUMENTS

| | | |
|---|---|---|
| 2015/0086127 A1 | 3/2015 | Camilus et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0047644 A1* | 2/2016 | Wong ............. G01B 9/02004 356/479 |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0174040 A1* | 6/2016 | Roberts ............. H04W 4/025 455/456.1 |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0124987 A1 | 5/2017 | Kim et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2018/0003925 A1 | 1/2018 | Shmunk |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0184010 A1 | 6/2018 | Cohen et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2018/0329281 A1 | 11/2018 | Ye |
| 2018/0368656 A1 | 12/2018 | Austin et al. |
| 2019/0100156 A1 | 4/2019 | Chung et al. |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0228562 A1 | 7/2019 | Song |
| 2019/0297238 A1 | 9/2019 | Klosterman |
| 2020/0092486 A1 | 3/2020 | Guo et al. |
| 2020/0103726 A1 | 4/2020 | Shabtay et al. |
| 2020/0104034 A1 | 4/2020 | Lee et al. |
| 2020/0134848 A1 | 4/2020 | El-Khamy et al. |
| 2020/0221026 A1 | 7/2020 | Fridman et al. |
| 2020/0264403 A1 | 8/2020 | Bachar et al. |
| 2020/0351462 A1* | 11/2020 | Yin .................... H04N 23/10 |
| 2020/0389580 A1 | 12/2020 | Kodama et al. |
| 2021/0180989 A1 | 6/2021 | Fukumura et al. |
| 2021/0333521 A9 | 10/2021 | Yedid et al. |
| 2021/0408094 A1* | 12/2021 | Jang ................ H01L 27/1463 |
| 2022/0252963 A1 | 8/2022 | Shabtay et al. |

FOREIGN PATENT DOCUMENTS

| | | | |
|---|---|---|---|
| CN | 102215373 A | 10/2011 | |
| CN | 102739949 A | 10/2012 | |
| CN | 102982518 A | 3/2013 | |
| CN | 103024272 A | 4/2013 | |
| CN | 203406908 U | 1/2014 | |
| CN | 103841404 A | 6/2014 | |
| CN | 205301703 U | 6/2016 | |
| CN | 105827903 A | 8/2016 | |
| CN | 105847662 A | 8/2016 | |
| CN | 107608052 A | 1/2018 | |
| CN | 107682489 A | 2/2018 | |
| CN | 109729266 A | 5/2019 | |
| CN | 111885322 A * | 11/2020 | ............. G01S 17/08 |
| EP | 1536633 A1 | 6/2005 | |
| EP | 1780567 A1 | 5/2007 | |
| EP | 2523450 A1 | 11/2012 | |
| JP | S59191146 A | 10/1984 | |
| JP | 04211230 A | 8/1992 | |
| JP | H07318864 A | 12/1995 | |
| JP | 08271976 A | 10/1996 | |
| JP | 2002010276 A | 1/2002 | |
| JP | 2003298920 A | 10/2003 | |
| JP | 2003304024 A | 10/2003 | |
| JP | 2004056779 A | 2/2004 | |
| JP | 2004133054 A | 4/2004 | |
| JP | 2004245982 A | 9/2004 | |
| JP | 2005099265 A | 4/2005 | |
| JP | 2005122084 A | 5/2005 | |
| JP | 2005321592 A | 11/2005 | |
| JP | 2006237914 A | 9/2006 | |
| JP | 2006238325 A | 9/2006 | |
| JP | 2007228006 A | 9/2007 | |
| JP | 2007306282 A | 11/2007 | |
| JP | 2008076485 A | 4/2008 | |
| JP | 2008271026 A | 11/2008 | |
| JP | 2010204341 A | 9/2010 | |
| JP | 2011055246 A | 3/2011 | |
| JP | 2011085666 A | 4/2011 | |
| JP | 2011138407 A | 7/2011 | |
| JP | 2011203283 A | 10/2011 | |
| JP | 2012132739 A | 7/2012 | |
| JP | 2013101213 A | 5/2013 | |
| JP | 2013106289 A | 5/2013 | |
| JP | 2016105577 A | 6/2016 | |
| JP | 2017146440 A | 8/2017 | |
| KR | 20070005946 A | 1/2007 | |
| KR | 20090058229 A | 6/2009 | |
| KR | 20100008936 A | 1/2010 | |
| KR | 20110080590 A | 7/2011 | |
| KR | 20130104764 A | 9/2013 | |
| KR | 1020130135805 A | 11/2013 | |
| KR | 20140014787 A | 2/2014 | |
| KR | 101428042 B1 | 8/2014 | |
| KR | 101477178 B1 | 12/2014 | |
| KR | 20140144126 A | 12/2014 | |

(56) References Cited

FOREIGN PATENT DOCUMENTS

| KR | 20150118012 A | 10/2015 |
|----|---------------|---------|
| KR | 20170105236 A | 9/2017 |
| KR | 20180120894 A | 11/2018 |
| KR | 20130085116 A | 6/2019 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

* cited by examiner

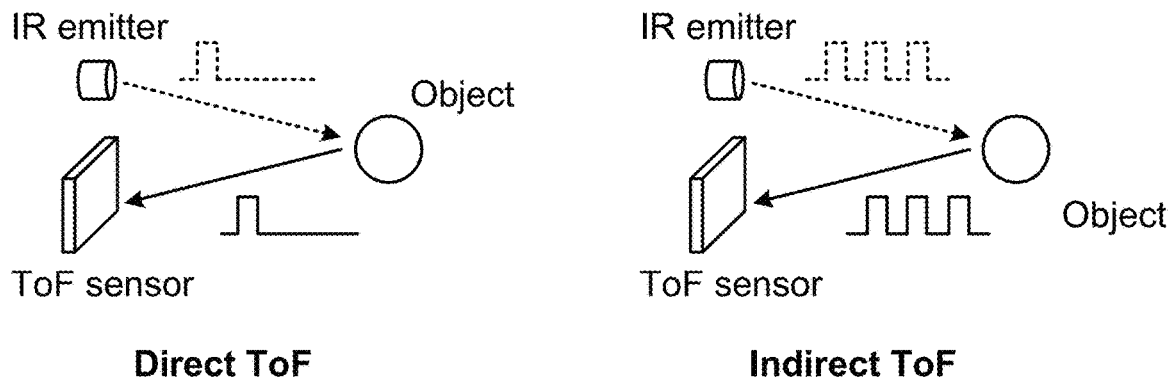
FIG. 1      KNOWN ART
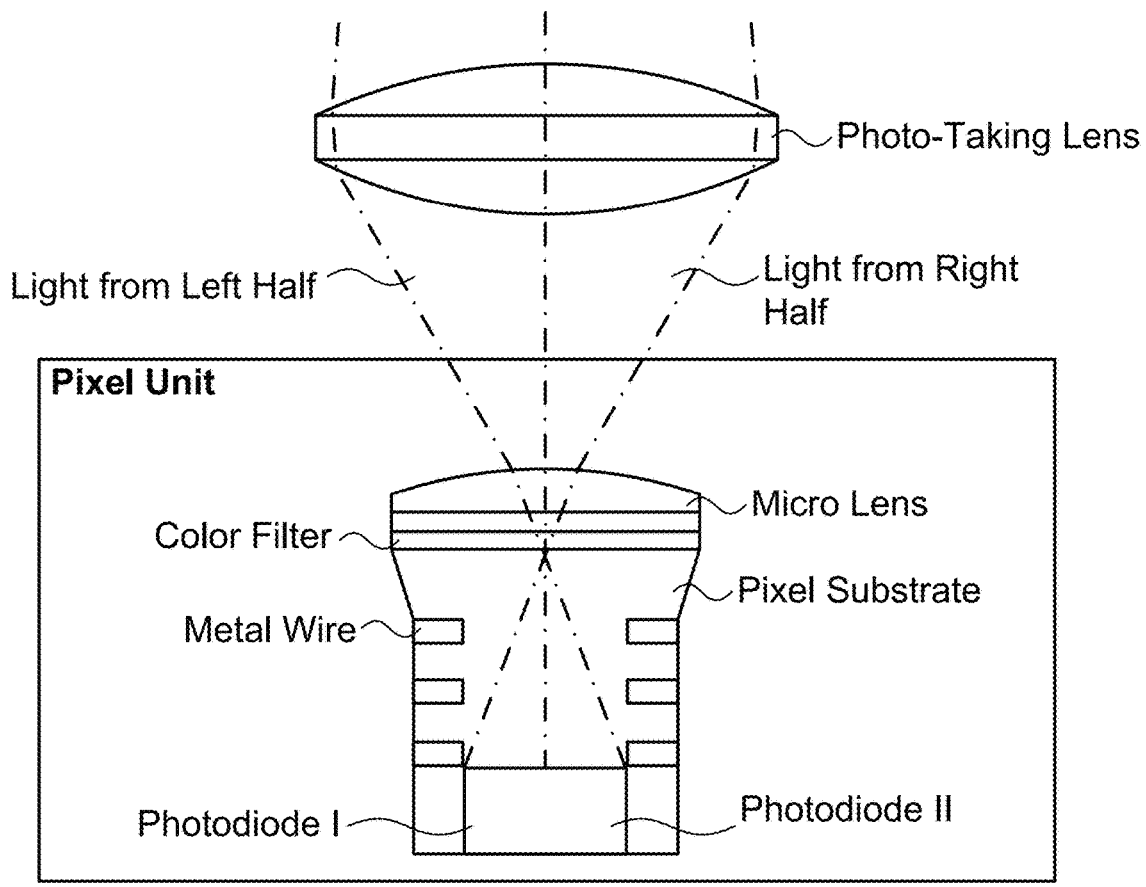
FIG. 2      KNOWN ART

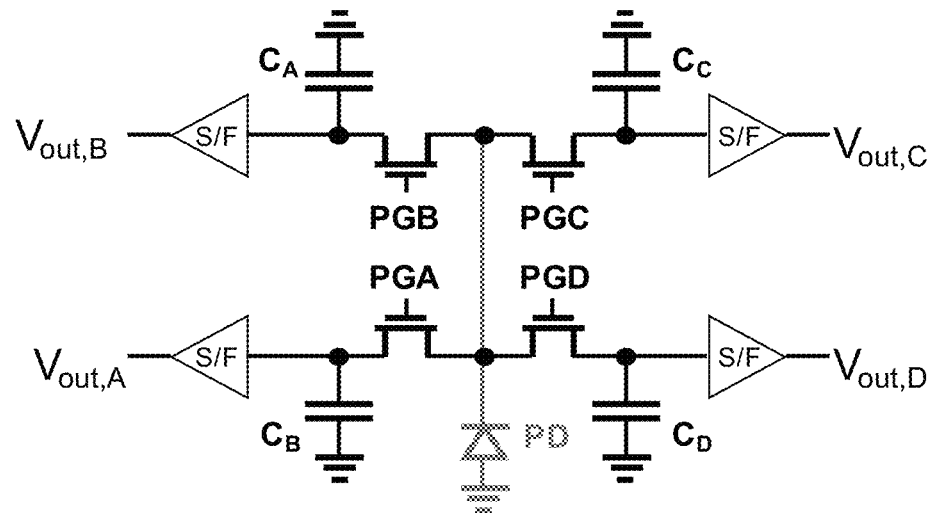
FIG. 3A  KNOWN ART
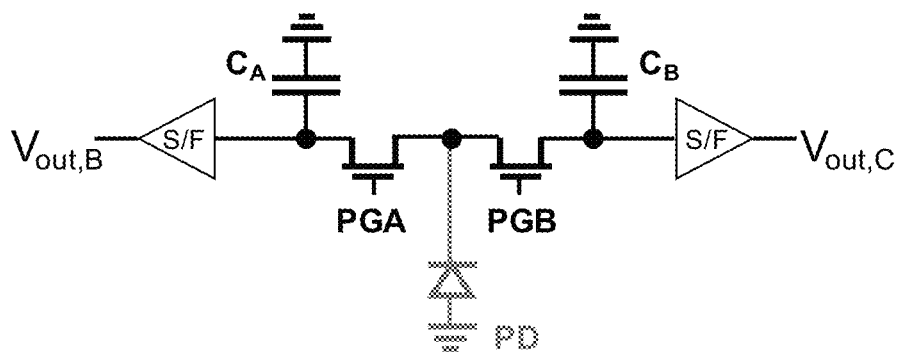
FIG. 3B  KNOWN ART

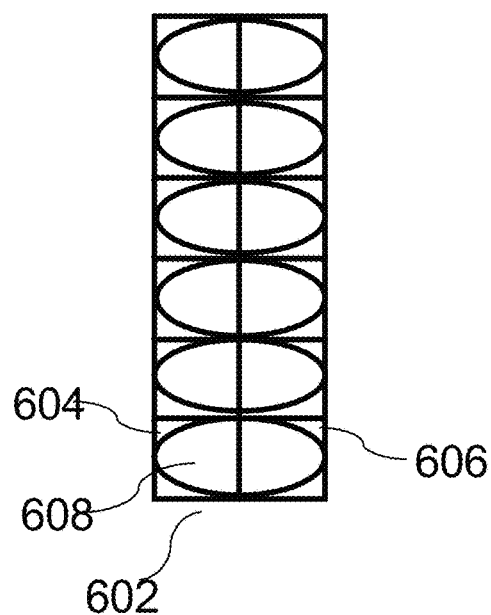 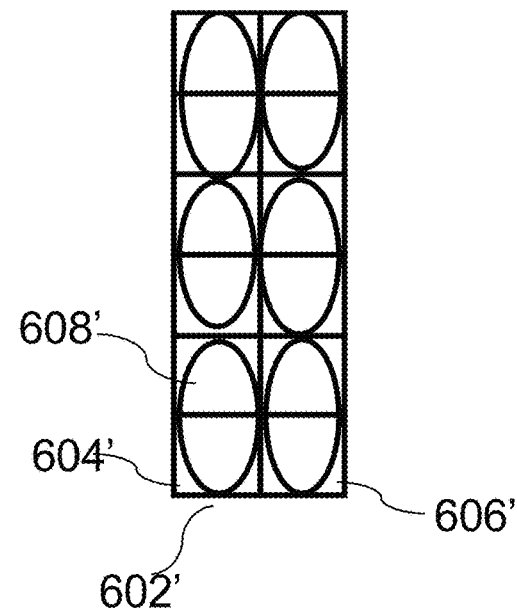
FIG. 6A  FIG. 6B
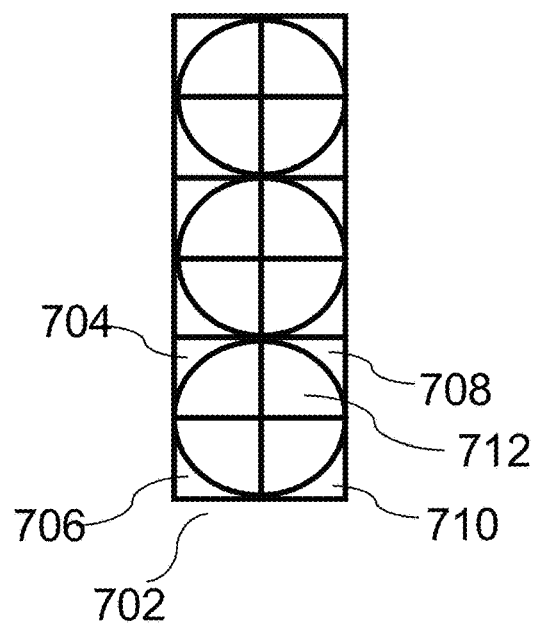
FIG. 7

IMAGE SENSORS AND SENSING METHODS TO OBTAIN TIME-OF-FLIGHT AND PHASE DETECTION INFORMATION

CROSS REFERENCE TO RELATED APPLICATIONS

This is a continuation application from U.S. patent application Ser. No. 18/186,151 filed Mar. 18, 2023, which was a continuation of application Ser. No. 17/375,299 filed Jul. 14, 2021 (issued as U.S. Pat. No. 11,637,977), and claims priority from U.S. Provisional Patent Applications No. 63/052,001 filed Jul. 15, 2020, and 63/055,912 filed Jul. 24, 2020, both of which are expressly incorporated herein by reference in their entirety.

FIELD

Embodiments disclosed herein relate in general to digital cameras and in particular to thin zoom digital cameras.

BACKGROUND

Recently, mobile devices such as cellphones (and in particular smartphones) have started to incorporate projection-and-imaging Time-of-Flight (ToF) systems. ToF systems are used for 3D based (or depth map) applications such as background-foreground segmentation, face modeling, security face identification (such as unlocking the mobile device, authorizing payments, etc.), augmented reality, camera effects (such as Bokeh), avatar animation, etc.

In ToF systems, depth information is obtained by measuring the travel time of a light pulse emitted by a light source by means of an image sensor with very high temporal resolution on a nanosecond (ns) time scale. In general, a ToF system uses light in the near infrared (NIR) region, referring to a wavelength range of about 780 nm-1120 nm, which is invisible to the human eye. Techniques for ToF can be divided into direct ToF (d-ToF) and indirect ToF (i-ToF), see FIG. 1. In d-ToF, an arrival time of a single light pulse is measured by a single photon avalanche diode (SPAD) sensor. In i-ToF, some form of light pulse is sent in several intervals and the arrival time is measured by continuously accumulating charges within buckets. These buckets have defined timestamps called demodulation taps (storage floating diffusion or "FD"). Typical modulation frequencies are about 100 MHz.

According to the emitted light pulse shape, i-ToF techniques are divided into continuous wave i-ToF ("CW ToF") and pulsed i-ToF (or "gated ToF"). In CW i-ToF, a sine signal is emitted repeatedly. In gated ToF, a rectangular function is emitted repeatedly. A ToF image sensor pixel that acts as the receiver of the back-reflected light pulses can be operated in CW ToF and gated ToF mode. In gated ToF, the signals of an image pixel's demodulation taps (storage FD) refer to spatial "3D slices" of a scene. Each tap is operated at a specific delay time with respect to pulse transmission and thus captures only light returning from a specific depth range. The depth of a 3D slice is defined by the pulse length.

Another 3D imaging method is stereo imaging. Images of a scene are captured from two points of view (POV) that are separated from each other by a vector called "baseline" B (not shown herein). 3D information is extracted by triangulation, which examines the relative positions of objects in the two images.

Phase-Detect Auto-Focus (PDAF) pixels can be used for stereo imaging with one aperture only. A most common implementation is dual-pixel autofocus ("2-PD AF"). In 2-PD AF, a sensor pixel is covered by one on-chip microlens (OCL) and divided into two photodiodes (PDs) I and II, as shown in FIG. 2. The signal of all PD I and all PD II from an image sensor including the 2-PD pixels correspond to an image of a scene as seen through the right side and the left side of a camera's lens respectively. So if one outputs all PD Is for forming a first image and all PD IIs for forming a second image, a stereo image pair is obtained that has a baseline B=aperture radius and a disparity of zero at the focus plane. From the stereo image pair, a stereo depth map can be calculated as known in the art. Here and further on, the terms "left side" and "right side" are discussed exemplarily and representative for any other orientation of the pixel in a camera and scene, such as "bottom side" and "top side" etc. When referring to stereo cameras hereinbelow, the reference is to a PDAF based stereo camera with a single aperture having a "virtual" baseline.

The disclosure below deals solely with i-ToF. For simplicity, the term ToF replaces i-ToF in the entire disclosure. In the following, ToF (i.e. i-ToF) pixels are shown as equivalent circuits (such as in FIG. 3A-B and FIG. 4A-C) for describing electrical properties of the pixel, or as schematic drawings (such as in FIG. 6A-B and FIG. 7) for describing optical and/or visual properties of the pixel. For the sake of simplicity, we refer as "ToF pixel" or "pixel" in both presentations.

FIG. 3A shows a known art embodiment of "4-tap" (or "4-phase") ToF pixel. 4-tap refers to the four "ToF phases" (or simply "phases") sampled in each measurement cycle. "ToF phase" or "phase" refers here and in the following to the phase relation of 1) a transmitted periodic light signal and 2) the returning periodic light signal captured by a ToF image sensor. It is not to be confused with the definition of "PDAF" given above. Generated charges are stored in 4 "storage nodes" $C_A$-$C_D$ (or sometimes called "charge collection bins") that are assigned to PGA ("pulse generator A", or sometimes called FDA for "floating diffusion node A"), PGB, PGC and PGD. The charges correspond to light that reaches the sensor having 4 phases (usually 0 deg, 90 deg, 180 deg and 270 deg) with respect to the phase of the transmitted light. The charges in each storage node are converted to output signals $V_{out}$ via source followers (S/F) acting as buffer. The distance of an object point can be calculated for each pixel from the four output signals $V_{out}$, as known in the art. Four phases are necessary for demodulating a sinus-like modulation signal. In 4-tap ToF, a depth map can be calculated for each frame (often referred to as "1-shot depth map"). In the following, the terms "storage node", "PGA" and "phase" etc. may be used interchangeably, implying that a pulse generator such as PGA corresponds to a particular phase and is accompanied by a storage node such as $C_A$.

Other embodiments known in the art may use a "2-tap" (or "2-phase") ToF pixel shown in FIG. 3B. For obtaining the 4 phases necessary for depth calculation, image data from two frames may be required. Typically, one may use t consecutive frames for depth calculation. In 2-tap implementation, two frames are required for calculating a 1-shot depth map.

In some examples commercially available today, 2-tap and 4-tap ToF cameras are used in a "tap-shuffle" read-out mode in order to mitigate sensor artifacts. For tap-shuffle, in a first frame the 2 phases (or 4 phases) are sampled in a "regular" order, i.e. PGA may sample the 0 deg phase and PGB may sample the 180 deg phase. In a second frame, the 2 phases (or 4 phases) are sampled in a "reversed" order, i.e.

PGA may sample the 180 deg phase and PGB may sample the 0 deg phase. For depth map calculation, averaged signals of both frames are used. That is, 4 frames are required for a 2-tap tap-shuffle depth map, and 2 frames are required for a 4-tap tap-shuffle depth map. Tap-shuffle increases the depth map accuracy, which is beneficial, but it increases the capture time of a depth map.

In some examples of ToF cameras commercially available today, a dual-frequency modulation is used for mitigating aliasing effects that lead to ambiguous depth measurements. For dual-frequency modulation the ToF pixel is operated at a first modulation frequency (e.g. 90 MHz) for generating a first depth map. For a second depth map the ToF pixel is operated at a second modulation frequency (e.g. 50 MHz). The final depth map is generated by a pixel-level calculation based on inputs from the first and the second depth map. For generating a depth map that uses both tap-shuffle and dual frequency modulation, a 2-tap depth map requires 8 frames and a 4-tap depth map requires 4 frames.

ToF image sensors can also be used for "regular" 2D imaging, i.e. for generating 2D images not including depth information.

Downsides of stereo imaging are for example missing disparity information for in-focus objects or for scene segments not including textures or any contrast gradients and a small baseline of single-aperture stereo cameras.

Downsides of ToF are for example low signal-to-noise ratios (SNR) for specular objects, scenes with high amount of background light, large lens-object distances as well as artifacts such as "flying pixel", "multi-path", multi-user interference and motion blur.

A challenge in smartphone based computational photography is to overcome the downsides of ToF and stereo imaging.

It would be beneficial to have a ToF image sensor that provides both time-of-flight image data as well as 2PD stereo image information and a method based on the output of this image sensor for generating a fused ToF/stereo vision depth map.

SUMMARY

In various embodiments, there are provided image sensor pixels comprising: a plurality of sub-pixels, each sub-pixel including a photodiode; a microlens covering the plurality of sub-pixels; and a read-out circuit (ROC) for extracting indirect time-of-flight (i-ToF) phase signals of each sub-pixel individually, wherein the image sensor pixel is an i-ToF image sensor pixel.

In some embodiments, the plurality of sub-pixels includes 2 sub-pixels.

In some embodiments, the plurality of sub-pixels includes 4 sub-pixels.

In some embodiments, each sub-pixel is a 4-tap pixel including 4 pulse generators.

In some embodiments, an i-ToF image sensor pixel includes a switch, wherein in one state the switch is closed so that the sub-pixels together form one pixel and the ROC reads out the one pixel for generating an i-ToF depth map, and wherein in another state the switch is opened so that the ROC reads out the sub-pixels individually for generating a stereo depth map.

In some embodiments, an image sensor pixel as above or below is included in an image sensor of a camera having a focal length f in the range of 1.5 mm-10 mm.

In some embodiments, an image sensor pixel as above or below is included in an image sensor of a camera having a f number f/# in the range of 1-3.

In some embodiments, an image sensor pixel as above or below is included in an image sensor of a stereo camera having a baseline B in the range of 0.5 mm-10 mm.

In some embodiments, each sub-pixel has a size of 1 μm-10 μm.

In some embodiments, the i-ToF image sensor pixel is integrated in an image sensor of a stereo camera that has a vertical baseline and a horizontal baseline.

In various embodiments, there are provided image sensors comprising a first image sensor pixel surrounded by regular i-ToF pixels as above or below, and a closest second image sensor pixel as above or below located at least five pixels away from the first image sensor pixel.

In some embodiments, the using a ROC to read out i-ToF phase signals of each sub-pixel individually includes using the ROC to read out all i-ToF signals generated by the plurality of the sub-pixels.

In some embodiments, the using a ROC to read out i-ToF phase signals of each sub-pixel individually includes using the ROC to read out fewer than all i-ToF signals generated by the plurality of the sub-pixels.

In some embodiments, the read out i-ToF phase signals are used to calculate a relative ToF depth map.

In some embodiments, the read out of fewer that all i-ToF phase signals reduces a cycle time required for phase image capturing by more than 50% with respect to a cycle time where all the i-ToF phase signals are read out.

In some embodiments, the read out of fewer than all i-ToF signals includes a read out of one i-ToF signal.

In some embodiments, the one-i-ToF phase signal is the i-ToF phase signal that includes the highest amount of image information of a scene.

In some embodiments, the read out i-ToF phase signals correspond to a stereo camera having a vertical or a horizontal baseline.

In some embodiments, the read out i-ToF phase signals correspond to a stereo camera having a vertical and a horizontal baseline.

In some embodiments, the using a read-out circuit to read out i-ToF phase signals of each sub-pixel individually further includes:
  obtaining a stereo depth map calculated from the i-ToF phase signals,
  obtaining an i-ToF depth map calculated from the i-ToF phase signals,
  analyzing the stereo depth map and the i-ToF depth map for assigning stereo scores to segments of the stereo depth map and ToF scores to the segments of the i-ToF depth map, and
  generating a fused depth map by using stereo depth map data for segments that have high stereo scores and using ToF depth map data for segments that have high ToF scores.

In some embodiments, the generating the fused depth map is done without using ToF depth map information, and the stereo depth map is calculated from the i-ToF phase signals from a single frame In some embodiments, the i-ToF depth map is a 1-shot depth map. In some embodiments, the i-ToF phase signals that are used for calculating the i-ToF depth map are obtained at 2 different modulation frequencies.

In some embodiments, the i-ToF phase signals that are used for calculating the i-ToF depth map are obtained by shuffling pulse generators in the pixel.

In some embodiments, the using a ROC to read out i-ToF phase signals of each sub-pixel individually includes using the ROC to read out fewer than all i-ToF signals generated by the plurality of the sub-pixels.

In some embodiments, the using a ROC to read out i-ToF phase signals of each sub-pixel individually includes using the ROC to read out all i-ToF signals generated by the plurality of the sub-pixels.

In some embodiments, fewer than all i-ToF phase signals are read out and used for obtaining the stereo depth map.

In some embodiments, only one of the i-ToF phase signals is read out and used for obtaining the stereo depth map.

In some embodiments, the relative TOF depth map is used to generate a high fps depth map stream having a fps greater than 30.

In some embodiments, the 1-shot depth map is used to generate a high fps depth map stream having a fps greater than 30.

In some embodiments, the fps is greater than 50.

In some embodiments, the fps is greater than 75.

In some embodiments, the only one of the i-ToF phase signals that is read out is the i-ToF phase signal that includes the highest amount of image information of a scene.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way.

FIG. 1 illustrates direct (d-ToF) and indirect ToF (i-ToF) techniques;

FIG. 2 illustrates a system for 2PD AF using Phase-Detect Auto-Focus (PDAF) pixels;

FIG. 3A shows a known art embodiment of a "4-tap" ToF pixel;

FIG. 3B shows a known art embodiment of a "2-tap" ToF pixel;

FIG. 6A shows a top view on a 2PD ToF pixel disclosed herein;

FIG. 6B shows a top view on another 2PD ToF pixel disclosed herein;

FIG. 7 shows a top view on a 4PD ToF pixel disclosed herein;

DETAILED DESCRIPTION

Figure 4A:
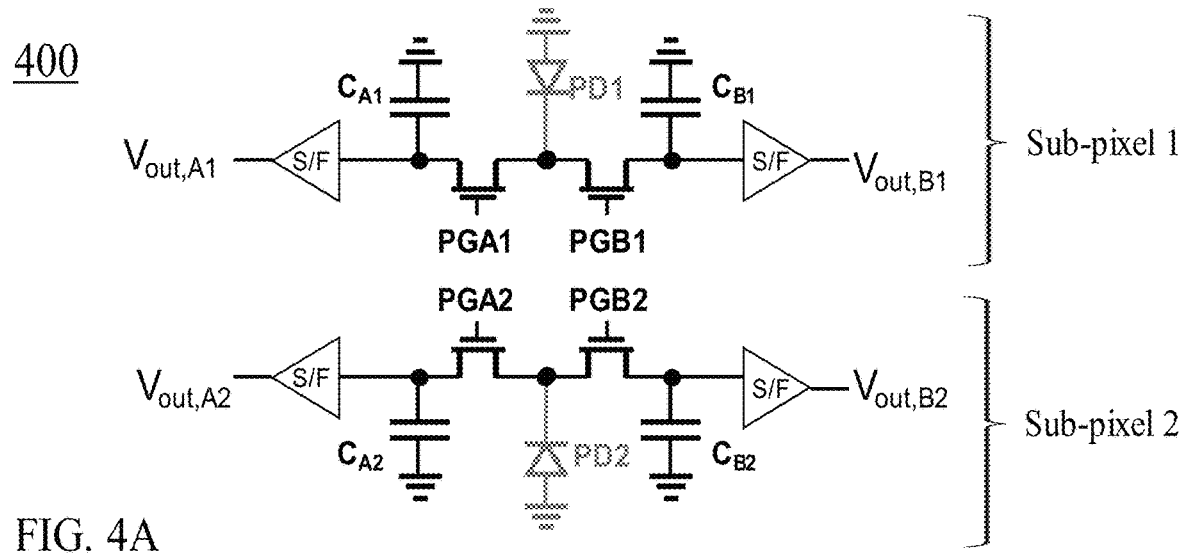
FIG. 4A shows an embodiment of an equivalent circuit of a 2PD ToF pixel disclosed herein.

FIG. 4A shows an embodiment of an equivalent circuit of a 2PD ToF pixel disclosed herein, the pixel numbered 400.

Pixel 400 is divided into a $1^{st}$ sub-pixel (also marked henceforth as SP1) and a $2^{nd}$ sub-pixel (also marked henceforth as SP2), where each sub-pixel (SP) resembles a "2-tap" ToF pixel. Each SP includes one PD: sub-pixel 1 (SP1) includes PD1 and sub-pixel 2 (SP2) includes PD2. Each PD is connected to two storage nodes, so that charge collected from PD1 is stored in PGA1 and PGB1, and charge collected from PD2 is stored in PGA2 and PGB2. With reference to FIG. 2, PD1 and PD2 may respectively correspond to a left PD and to a right PD that collect light passing through a right side and a left side of a camera's lens respectively. Thus all sub-pixels 1 may correspond to a left side of a camera's lens and all sub-pixels 2 may correspond to a right side of a camera's lens. In conclusion, a stereo image with baseline B=aperture radius may be obtained by considering all or some plurality (of number N) of $1^{st}$ sub-pixels forming a left-side 2D image and all or some plurality (of number N) of $2^{nd}$ sub-pixels forming a right-side 2D image.

Figure 4B:
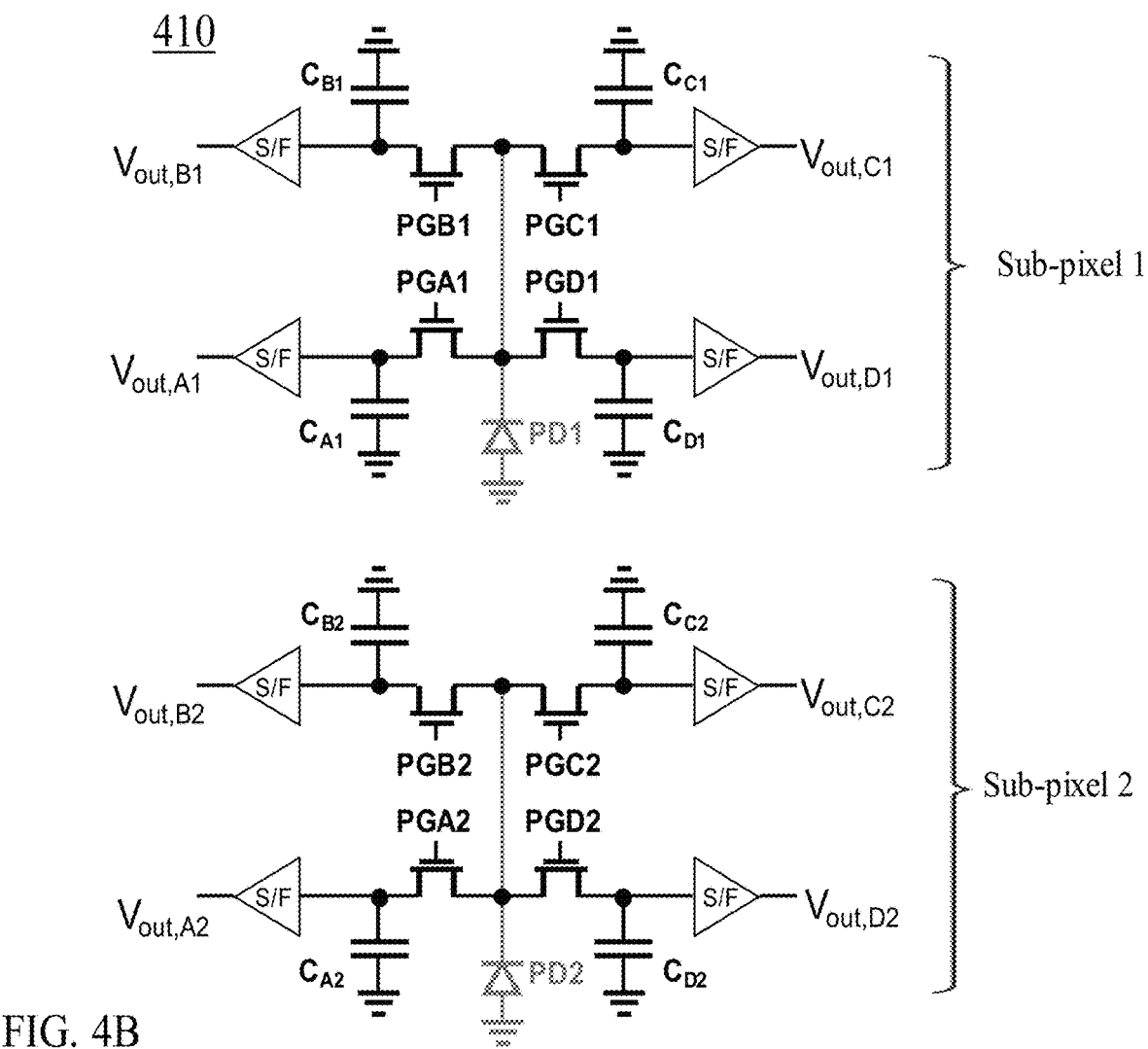
FIG. 4B shows another embodiment of an equivalent circuit of a 2PD ToF pixel disclosed herein.

FIG. 4B shows another embodiment of an equivalent circuit of a 2PD ToF pixel disclosed herein, the pixel numbered 410. Pixel 410 is divided into a $1^{st}$ and a $2^{nd}$ SP, whereas each SP resembles a "4-tap" ToF pixel. SP1 includes PD1 and SP2 includes PD2. Each PD is connected to four storage nodes, so that charge collected from PD1 is stored in PGA1, PGB1, PGC1 and PGD1 and charge collected from PD2 is stored in PGA2, PGB2, PGC2 and PGD2. With reference to FIG. 2, and as in pixel 410, PD1 and PD2 may correspond to a left PD and to a right PD that collect light passing through a right side and a left side of a camera's lens respectively. Pixel 400 or pixel 410 may be included in a 2PD ToF Pixel with a pixel layout such as shown in FIG. 6A and FIG. 6B.

In a "binning mode", SPs of ToF pixels may be summarized as a single "effective" pixel. In some examples, a binning mode may be implemented in the analog domain by adding the signals $V_{out}$ of equal phases, for example and with reference to FIG. 4A by adding $V_{out,A1}$ and $V_{out,A2}$ as well as adding $V_{out,B1}$ and $V_{out,B2}$. In other examples, a binning mode may be implemented by adding charges present in the storage nodes C of equal phases, for example and with reference to FIG. 4A by adding $C_{A1}$ and $C_{A2}$ as well as adding $C_{B1}$ and $C_{B2}$. In yet other examples, a binning mode may be implemented in the digital domain.

Figure 4C:
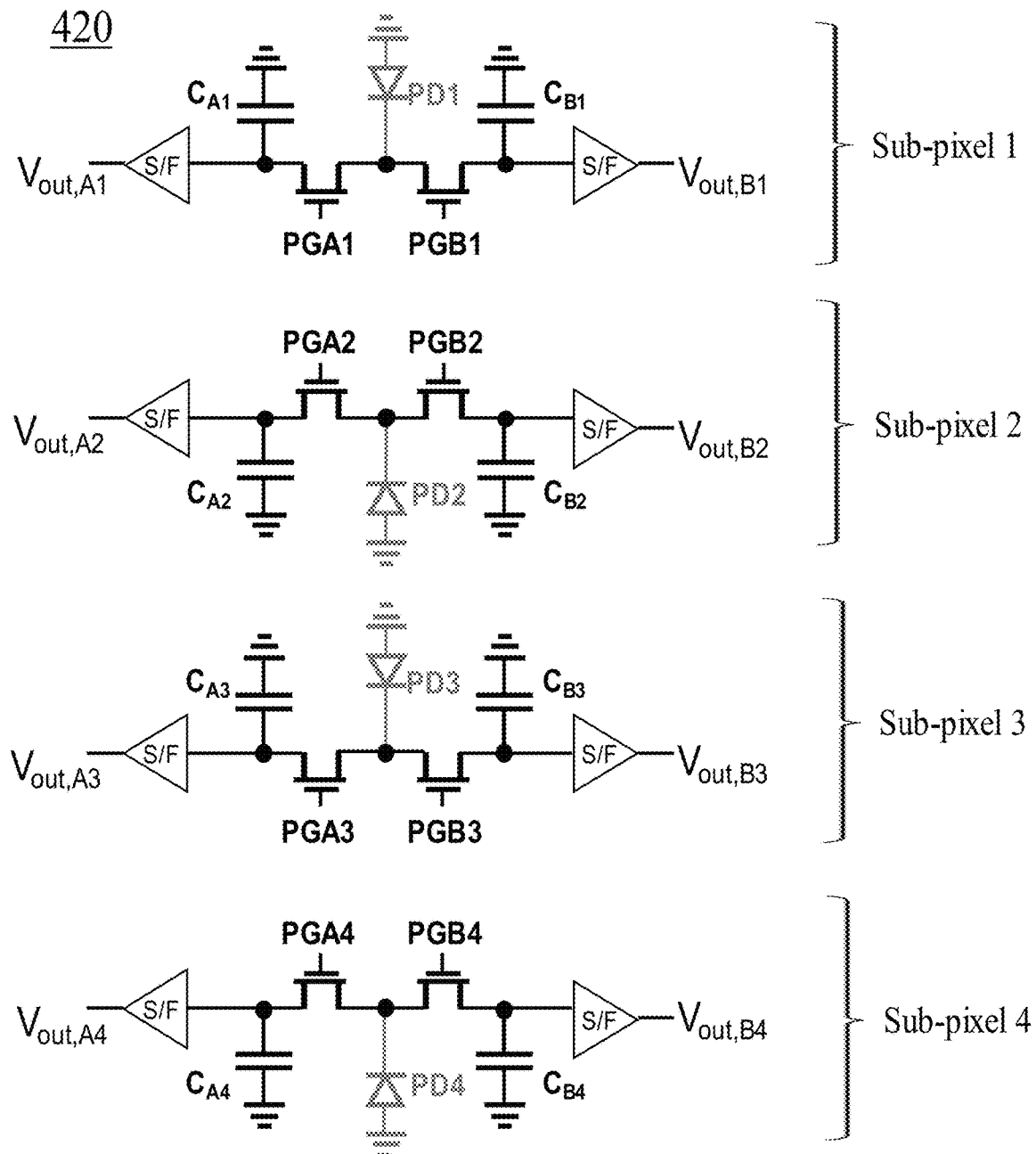
FIG. 4C shows an embodiment of an equivalent circuit of a 4PD ToF pixel disclosed herein.

FIG. 4C shows an embodiment of an equivalent circuit of a 4PD ToF pixel disclosed herein, the pixel numbered 420. Pixel 420 is divided into four SPs marked SP1, SP2, sub-pixel 3 (SP3) and sub-pixel 4 (SP4), whereas each SP resembles a "2-tap" ToF pixel. SP1 includes PD1, SP2 includes PD2, SP3 includes PD3 and SP4 includes PD4. Each PD is connected to two storage nodes, so that charge collected from each PD is stored in the two connected storage nodes $C_{Ai}$ and $C_{Bi}$ where i=1, . . . , 4. Pixel 420 may be included in a pixel such as shown in FIG. 7. As an example and with reference to FIG. 2 and FIG. 7, SP1 may correspond to a top-left SP such as SP 704 that collects light passing through a bottom-right side of a camera's lens. SP2 may correspond to a bottom-left SP such as SP 706 that collects light passing through a top-right side of a camera's lens etc. In stereo imaging such as phase imaging, a depth in a scene that varies along only one direction can be sensed with a stereo camera having a baseline parallel to that direction, but not with a stereo camera having a baseline which is orthogonal to that direction. As known in the art with a sensor having only 2PD pixels of identical orientation, only a horizontal or only a vertical depth can be sensed by phase imaging. With a 4PD pixel described herein both a horizontal and a vertical depth can be sensed by phase imaging.

Other 4-PD embodiments may include 4 SPs realized in a 4-tap ToF pixel structure, i.e. each SP i (i=1, . . . , 4) may have 4 storage nodes $PGA_i$-$PGD_i$. Charges collected by each PD of the 4 PDs may be stored in the 4 storage nodes $PGA_i$-$PGD_i$ (i=1, . . . , 4). For example, charges collected in PD1 may be stored in each of $C_{A1}$, $C_{B1}$, $C_{C1}$ and $C_{D1}$ etc.

Figure 4D:
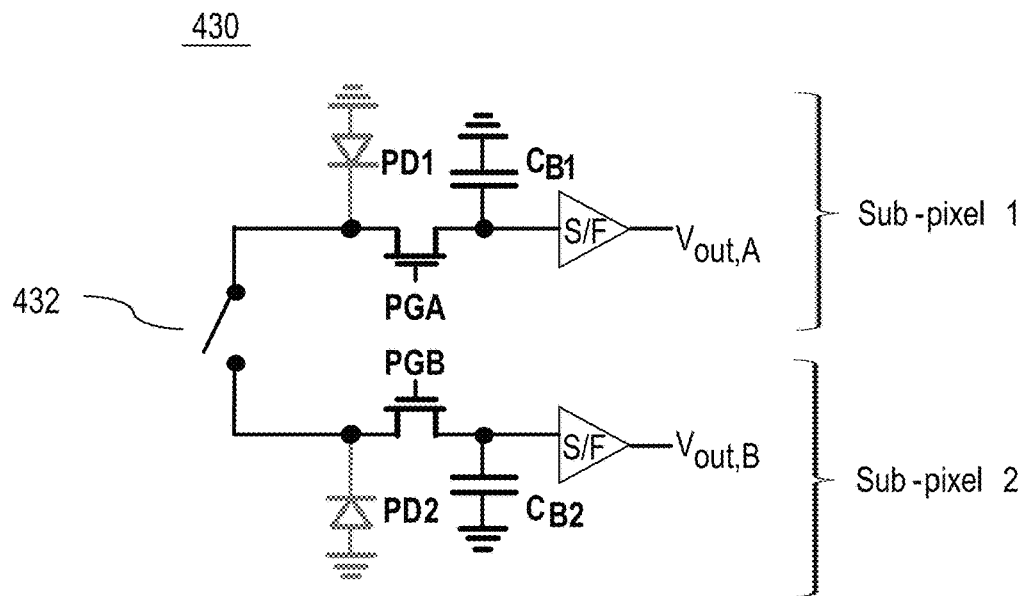
FIG. 4D shows yet another embodiment of a 2PD ToF pixel disclosed herein.

FIG. 4D shows another embodiment of a 2PD ToF pixel disclosed herein, the pixel numbered 430. An image sensor based on pixel 430 is not to be used for simultaneously generating a ToF and a stereo depth map, but for generating a ToF depth map or a stereo depth map.

For generating a ToF depth map, switch 432 is closed (not shown), so that PD1 and PD2 together form one PD. The one PD is driven in a 2-tap ToF pixel and a ToF depth map is calculated as known in the art.

For generating a stereo depth map, switch 432 is opened (as shown in FIG. 4D), and PD1 and PD2 are separated from each other. PD1 and PD2 are read out separately and a stereo depth map is calculated as known in the art.

In some embodiments, the switches of all pixels included in a ToF image sensor may be controlled together, i.e. the switches of all pixels may be opened, or the switches of all pixels may be opened closed. In other embodiments, each pixel or each group of pixels may be controlled individually. For example based on information from past images or frames, one may open or close the switch of a particular pixel for calculating a stereo depth or a ToF depth of this particular pixel.

Figure 4E:
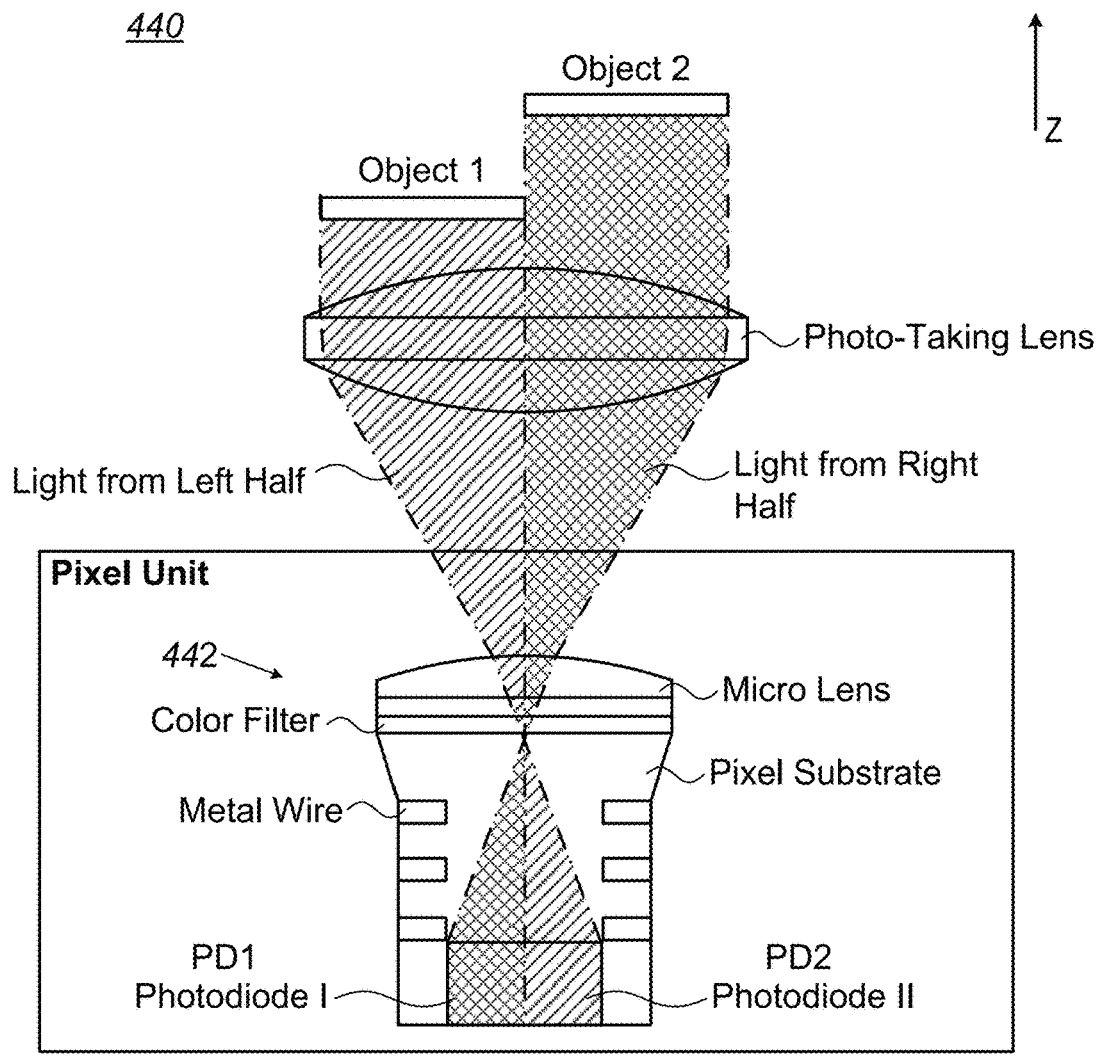
FIG. 4E shows a 2PD ToF depth measurement scenario disclosed herein.

FIG. 4E shows a 2PD ToF depth measurement scenario disclosed herein, with a camera 440 including a 2PD ToF pixel 442. A signal from a first object ("object 1") distanced at $z_1$ from camera 440 passes the left half of the camera's lens, a signal from a second object ("object 2") distanced at $z_2 > z_1$ from camera 440 passes the right half of the camera's lens.

If a pixel like 430 is used for calculating a ToF depth, the depth signal will suffer from "flying pixel" artifact. For generating a ToF depth, in a pixel like 430 PD1 and PD2 together form one PD. In the given scenario this means that the depth signals of object 1 (at $z_1$) and object 2 (at $z_2$) are intermixed, leading to a flying pixel depth signal ("$z_{FP}$") which provides a depth signal $z_1 < z_{FP} < z_2$.

If a pixel like 400 or like 410 is used for calculating a ToF depth, the depth signal will not suffer from "flying pixel" artifact, as for generating a ToF depth, PD1 and PD2 can be evaluated independently.

Figure 5:
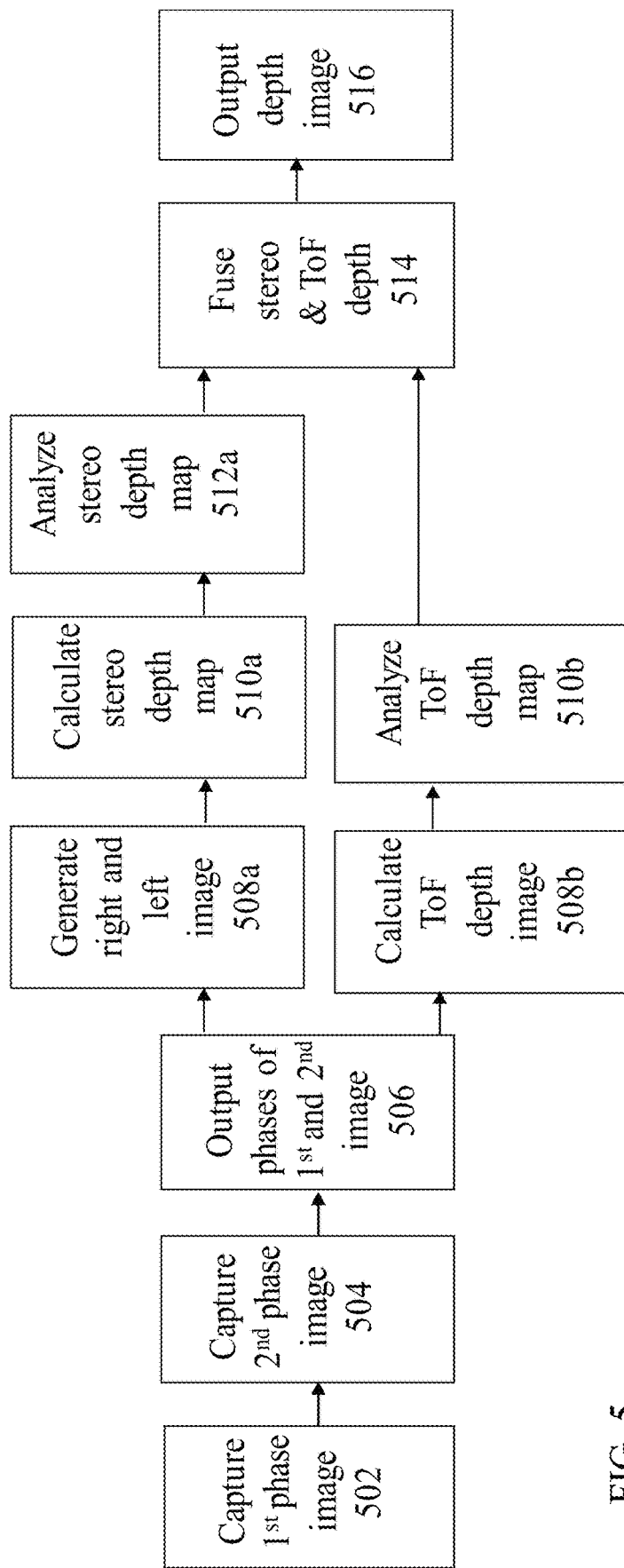
FIG. 5 shows a method for generating a depth map based on a 2PD ToF pixel disclosed herein.

FIG. 5 shows a method for generating a depth map based on a 2-tap 2PD ToF pixel like pixels 400. In 2-tap, two phases (PGA and PGB) are measured in each image (or "frame"). In step 502 a first phase image is captured. In the first image and exemplarily, PGA1 and PGA2 may both be configured to capture a 0 deg phase, and PGB1 and PGB2 may both be configured to capture a 180 deg phase. In step 504, a second phase image is captured. In the second image and exemplarily, PGA1 and PGA2 may both be configured to capture a 90 deg phase, and PGB1 and PGB2 may both be configured to capture a 270 deg phase.

In step 506 all phase values are output for further processing. Further processing may be performed by an application processor (AP) or any other processing device, as known in the art. The further processing includes the calculation and analysis of a stereo depth map (steps 508a-512a) as well as the calculation and analysis of a ToF depth map (steps 508b-510b). Steps 508a-512a and steps 508b-510b may be performed sequentially or in parallel such as depicted in FIG. 5.

With reference to first and second images described above, consider a first example ("Example 1") referring to a 2-tap pixel and a "1-shot depth map" approach. In Example 1, both step 502 and step 504 are performed once for capturing two images that in sum include 4 phases (0 deg, 90 deg, 180 deg and 270 deg). The 4 phases are output (step 506) and a ToF depth map is calculated in 508b. In other examples referring to a 2-tap pixel design, methods known in the art such as tap-shuffle and dual-frequency may be applied. For this, step 502, step 504 (and step 506) may be performed repeatedly, e.g. four times when using dual-frequency and tap-shuffle for each of the two frequencies.

In a second example ("Example 2"), referring to a 4-tap pixel design and a "1-shot depth map" approach, there may be only one image capture required, i.e. only step 502 may be performed before outputting the 4 phases in step 506.

Stereo Depth Map

In step 508a, 2D images of SP1 and of SP2 are generated. 2D images of SP1 correspond to left-side images (i.e. images that contain only image data passing the left side of the camera lens), while 2D images of SP2 correspond to right-side images (i.e. images contain only image data passing the right side of the camera lens). Generation of 2D images may be performed according to different options. In the following, we refer to Example 1.

In some examples that may be referred to as "single-phase" images, a 2D image may be generated by outputting the values of one of the four storage node signals. Exemplarily referring only to the left-side 2D image (SP1), the four existing storage node signals are: PGA1 (0 deg), PGB1 (90 deg), PGB1 (180 deg) and PGB1 (270 deg). In some examples of single-phase images, only the storage node signal containing the highest amount of image information may be output for forming the 2D image. As an example for determining a highest amount of image information, one may sum over the particular phase signals of all pixels for each storage node, and define the storage node having the largest sum as the storage node that contains the highest amount of image information.

In other examples that may be referred to as "all-phase" images, a 2D image may be generated by outputting the sum over all signals of all the storage nodes. Exemplarily for SP1, the pixel's value may be obtained by summing PGA1 (0 deg), PGB1 (90 deg), PGB1 (180 deg) and PGB1 (270 deg).

In yet other examples of images, a 2D image may be generated by using some combination of single-phase images and all-phase-images. As an example, one may use only two out of the four existing storage node signals for generating the 2D image.

In yet other examples, a 2D image may be generated by using only storage node signals from identical frames, i.e. only from an image captured in step 502, or only from an image captured in step 504. This method for 2D image generation may be beneficial when capturing a dynamic scene where there are significant changes between the two captures in step 502 and 504, as a depth map can be calculated from each frame. In comparison to e.g. a depth map generated by ToF with using tap-shuffle and dual-frequency, for 2-tap and 4-tap ToF this corresponds to ×8 and ×4 increase in depth map fps respectively.

In yet other examples where more than two frames are captured (i.e. where steps 502-506 are performed repeatedly), a 2D image may be generated by averaging over storage node signals from different frames. For example, one may average over identical phases of all captured frames or one may average over particular phases (e.g. PGA1 and PGA2) of all captured frames or some of the captured frames.

In step 510*a*, left-side and right-side 2D images are used to calculate a stereo depth map. As known, for a regular stereo vision system having two apertures spatially separated by baseline B, an object's distance can be calculated and/or estimated using equation 1:

$$Z' = \frac{f \cdot B}{D \cdot ps} \quad (1)$$

where Z' is the depth estimation for a particular pixel which may to be calculated by a processing unit, f is the camera's focal length, D is the disparity in pixels, and ps is the pixel size of the image sensor. The disparity in pixels refers to the property of stereo vision systems (e.g. to a dual-camera) that, when after image alignment an object point in focus is imaged to two different image points in the two output images, the magnitude of this difference is the disparity D. Via the measurement of the disparity D between two aligned stereo images, the depth of an object can be calculated according to the equation 1.

For the regular stereo vision system see above, disparity D is given by $$D = \frac{f \cdot B}{Z \cdot ps} \quad (2)$$

with Z being the object-lens-distance of an object point. For an object at infinity, D approaches zero.

For a 2PD camera as described above, the disparity is zero for an object point in focus, i.e. in focus the stereo image pair entirely overlaps. So for the 2PD camera with baseline B=aperture radius, disparity D is given by $$D = \frac{f \cdot B}{ps} \cdot \left(\frac{1}{z} - \frac{1}{z_0}\right) \quad (3)$$

with $z_0$ being the distance from the lens to the focus plane.

In step 512*a*, the stereo depth map is analyzed. The analysis may assign a confidence score to particular pixels or segments of pixels of the depth map. A high confidence score may refer to a high quality depth information, and a low confidence score may refer to a low quality depth information. Low quality depth information may e.g. be obtained for captured scene segments that do not include clearly visible textures, contours or any other contrast gradients that are required for aligning the stereo images and for determining disparity D, and/or have medium (3-5 m) or large (>5 m) lens-object distances.

Additionally, the analysis may assign a resolution score to particular pixels or segments of pixels of the depth map. The resolution score may serve as a measure of the depth resolution and/or the spatial resolution (i.e. pixel resolution) of the depth map.

The resolution score and the confidence score of a stereo depth are called "stereo score".

ToF Depth Map

In step 508*b*, the object-lens distance (i.e. depth) of all object points in a scene is calculated by using the 4 phases (0 deg, 90 deg, 180 deg and 270 deg) as known in the art for ToF. In some examples, before calculating the ToF depth image, all or some of the phase signals of the SPs that have identical phase relation may be summed (e.g. by "binning" as described above). An identical phase relation may be given for PGA1 and PGA2 as well as for PGB1 and PGB2 etc. In other examples, the ToF depth image may be calculated by using the phase signals of each of the SPs individually, i.e. a plurality of ToF depth images may be calculated. In some examples, one may fuse the plurality of ToF depth images to obtain a single ToF depth image. In other examples, one may average the plurality of ToF depth images to obtain a single ToF depth image. In step 510*b*, the ToF depth map is analyzed. The analysis may assign a confidence score to particular pixels or segments of pixels of the depth map. A high confidence score may refer to a high quality depth information, and a low confidence score may refer to a low quality depth information. Low quality depth information may be obtained for ToF depth map segments that include:

specular objects which do not reflect much light in direction of the ToF sensor;
a high amount of ambient or background light;
fast moving objects that lead to motion blur artifacts;
"flying pixel" and "multi-path" artifacts as known in the art;
multi-user interference as known in the art, or
large (>4m) lens-object distances.

Additionally, the analysis may assign a resolution score to particular pixels or segments of pixels of the ToF depth map. Resolution score and confidence score of a ToF depth map are called ToF score.

Fusion of Stereo and ToF Information

In step 514, a high-quality depth map is generated by fusing stereo and ToF depth map segments as known in the art. In some examples, one may consult measures such as a confidence score or a resolution score in order to decide whether the stereo depth map or the ToF depth map is to be used for the particular segment of the fused depth map.

In step 516, the fused depth map generated in step 514 is output to a program or user. In some examples, the fused depth map generated in step 514 may include stereo depth information or ToF depth information only. A depth image including stereo depth information only may e.g. be beneficial for obtaining a stream of depth maps having high fps, i.e. a fast depth map mode, as from the 2PD stereo image pair a depth map can be calculated for each frame.

In examples for fast depth map modes, a ToF pixel such as 2-tap ToF pixel 400 may be operated in a high fps mode that does not support ToF depth calculation.

Consider an example ("Example 3") for achieving a high fps depth map stream by including stereo depth information only: one may capture a first phase image in step 502 and output the phase of this first phase image in step 506 without capturing a second phase image in step 504. From this first image, a stereo depth map may be calculated in step 510*a* which is output in step 516.

Another example ("Example 4") for achieving a high fps depth map stream may be based on a reduced read out scheme and including stereo depth information only. Here and in the following, a depth map fps may be called "high" for fps=30 or more, e.g. fps=60 or fps=240. In example 4, one may expose a pixel such as pixel 400 and collect charges in the storage nodes as known in the art. However, for the sake of higher fps one may e.g. read out only PGA1 and PGA2, but one may not read out PGB1 and PGB2. This is in contrast with the commonly performed reading out of PGA1, PGA2, PGB1 and PGB2 that are required for ToF depth map generation. The overall cycle time $T_{cycle}$ required for phase image capturing comprises an "integration" phase lasting the integration time $T_{int}$ which may e.g. be about 0.1 ms-5 ms, and a read out phase lasting the read out time $T_{read}$. In general, $T_{read}$ takes a significantly larger share of $T_{cycle}$ than $T_{int}$. As an example with relevance for a modern 4-tap ToF image sensor, $T_{read}$ may e.g. make up about 50%-90% of $T_{cycle}$, and $T_{read}$ may be about $T_{read}=5 \cdot T_{int}-25 \cdot T_{int}$. Here, $T_{read}$ is the time required for reading out all taps, and it can be reduced by not reading all taps. So referring to a 2-tap pixel where only one tap per SP is read out, $T_{cycle}$ can be reduced by 10%-100%, leading to a fps increase by 10%-100%. Referring to a 4-tap ToF pixel such as pixel 410 where only one tap per SP is read out, $T_{cycle}$ can be reduced by 10%-300% leading to a fps increase by 10%-300%. For example, one may read out only PGA1 and PGA2 but not read out PGB-PGD1 and PGB-PGD2. The phase images of only PGA1 and PGA2 may be used for extracting a stereo depth map. Whereas we refer here to reading out PGA1 and PGA2 only, and not reading out all other storage nodes, one may, in an analog manner, only read PGB1 and PGB2. Other possibilities may include reading out only PGA1 and PGA2 and not reading out all other storage nodes, etc. One may select which storage node pair to read out according to a pre-defined read-out scheme, e.g. such as always reading out PGA1 and PGA2 only. In other examples one may select the read-out scheme dynamically, e.g. according to the amount of scene information stored in the respective storage nodes. For example, one may determine in pre-view, i.e. before the actual depth map is captured according to steps 502-516, which storage node pair (such as PGA1 and PGA2, or PGB1 and PGB2 etc.) includes the highest amount of image information.

In other examples for fast depth map modes, a ToF pixel may be operated in a high fps mode that supports calculation of a relative ToF depth map. A relative depth map provides a depth value for a particular pixel not as an absolute depth value (such as e.g. a depth of 1 m or 1.5 m), but only as a ratio of the depth of the other pixels in the sensor. As an example, the depth value of a particular pixel located at a position (i, j) in the sensor array may be $d_{ij}$. Value $d_{ij}$ may have no absolute depth assigned, but may be expressed in terms of other pixels in the sensor, e.g. depth value $d_{ij}$ may be 75% the depth value of a neighboring pixel at a position (i+1,j), i.e. $d_{ij}=0.75 \cdot d_{i+1,j}$. Wherein for the calculation of an absolute depth map four phase signals are required, for calculating a relative depth only two (or more) phase signals are required.

Consider an example ("Example 5") relevant for a 4-tap pixel such as pixel 410: for achieving a high fps depth map stream including a relative ToF depth map a reduced read out scheme as described in Example 4 may be used. The 4-tap pixel may be integrated in a "gated ToF" system as known in the art, i.e. the light source of the ToF system may emit a rectangular pulse. In gated ToF, the storage nodes correspond to particular depth slices in a scene. One may therefore select which storage node pairs to read out according to which depth slices are considered to carry the most relevant or important information of a scene. E.g. one may read out only the pairs PGA1 and PGA2 as well as PGB1 and PGB2, but one may not read out the pairs PGC1 and PGC2 as well as PGD1 and PGD2. This may allow for a fps increase of the depth map stream of 10%-100%.

Another example ("Example 6") is relevant for a 2-tap pixel such as pixel 400 and for achieving a high fps depth map stream including a relative ToF depth map. A reduced read out scheme may e.g. be:
- in step 502, read out only PGA1 and PGA2 (which may sample the 0 deg phase) but do not read out PGB1 and PGB2 (which may sample the 180 deg phase).
- in step 504, read out only PGA1 and PGA2 (which may sample the 90 deg phase) but do not read out PGB1 and PGB2 (which may sample the 270 deg phase).

This may allow for a fps increase of the depth map stream of 10%-100%.

In some examples, the combination or fusion of stereo depth and ToF depth may be used for overcoming the ToF depth ambiguity, e.g. instead of using the dual-frequency modulation. So instead of using a second and additional modulation/demodulation frequency, mitigating depth ambiguity may be performed by using the stereo depth map calculated in step 510a. Also this can be used for increasing fps of a depth map stream.

A yet another example ("Example 7") is especially relevant for a pixel like 2-tap pixel 430. In a first example of example 7 (switch 432 open) for generating a stereo depth map, only steps 508a, 510a and 512a may be performed, and steps 508b and 510b may not be performed. In a second example of example 7 (switch 432 closed) for generating a ToF depth map, only steps 508b and 510b may be performed and steps 508a, 510a and 512a may not be performed.

In a yet another example ("Example 8") and for a pixel like 2-tap pixel 430, in a further step that precedes step 502, it may be decided for each pixel (or group of pixel) whether it is used as a ToF pixel or as a stereo pixel. For pixel 430 used as ToF pixel, switch 432 is closed, for pixel 430 being used as stereo pixel, switch 432 is opened. The decision whether to use a particular pixel as a ToF or as a stereo pixel, may e.g. be decided based on the ToF score and/or the stereo score that are obtained from prior depth images. In some examples for generating a depth map only using stereo image data, one may operate a 2PD ToF pixel as described herein in a "passive" manner, i.e. one may not use the light source of the ToF system but one may rely on the ambient or background illumination only.

FIG. 6A shows a top view of an exemplary 2PD ToF pixel layout disclosed herein, the pixel layout numbered 602. "Layout" refers here to the physical or visual appearance of a pixel. Pixel layout 602 comprises a first SP 604 hosting a first PD (PD1) and a second SP 606 hosting a second PD (PD2). Each of the two SPs may be realized in a 2-tap pixel design (such as shown in FIG. 4A) or in a 4-tap pixel design (such as shown in FIG. 4B). An OCL 608 covers both 604 and 606. The SPs and the OCL are oriented horizontally, corresponding to a horizontal baseline B (not shown).

FIG. 6B shows an exemplary top view of another 2PD ToF pixel layout 602' as disclosed herein. Pixel layout 602' comprises a first subpixel 604' (hosting PD1) and a second subpixel 606' (hosting PD2). An OCL 608' covers both 604' and 606'. The SPs and the OCL are oriented vertically, corresponding to a vertical baseline B (not shown). Here "vertical" is defined by assuming a ToF image sensor as disclosed herein included in a ToF camera so that the vertical OCL is oriented parallel to a vertical line in the scene. The same holds for the definition of a horizontal orientation of the OCL.

In some examples, pixels with pixel layout 602 or 602' may be "sparsely" integrated into an image sensor, i.e. these 2PD ToF pixels may be surrounded by regular (i.e. non-2PD) ToF pixels. A "next" 2PD ToF pixel may e.g. be located 5 or 10 or 25 or 50 pixels away from a 2-PD pixel with a pixel layout such as 602 or 602'. In other examples and such as shown in FIG. 6A, all ToF pixels may be 2PD pixels that are covered by a joint OCL.

FIG. 7 shows a top view on an exemplary 4PD ToF pixel layout 702 as disclosed herein. Pixel layout 702 comprises a first SP 704 hosting a first PD (PD1), a second SP 706 hosting a second PD (PD2), a third SP 708 hosting a third PD (PD3) and a fourth SP 710 hosting a fourth PD (PD4). Each of the four SPs may be realized in a 2-tap pixel design (such as shown in FIG. 4C) or in a 4-tap pixel design (not shown). An OCL 712 covers 704, 706, 708 and 710. In some examples, pixels with pixel layout 702 may be "sparsely" integrated into an image sensor, i.e. the 4PD ToF pixels may be surrounded by regular (i.e. non-4PD) ToF pixels and wherein a next 4PD ToF pixel may be located 5 or 10 or 25 or 50 pixels away from a 4PD-pixel in a pixel layout such as 702. In other examples and such as shown in FIG. 7, all ToF pixels may be 4PD pixels covered by a joint OCL. There are SP pairs having horizontal orientation and there are SP pairs having vertical orientation, so the 4PD Pixel design corresponds to horizontal and vertical baselines B (not shown).

Figure 8:
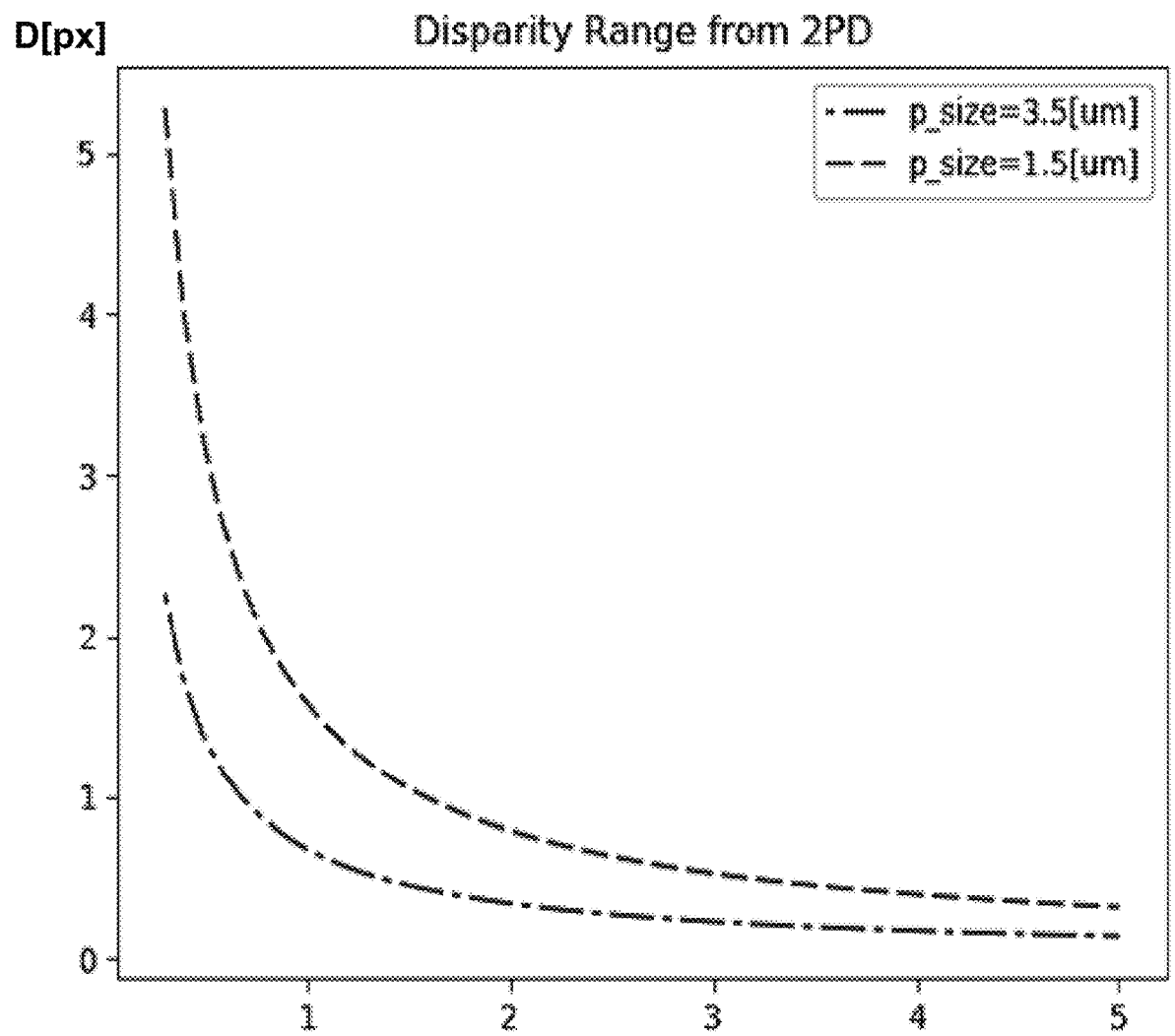
FIG. 8 shows a comparison of the expected disparity versus object-lens distance using an image sensor and sensing method disclosed herein.

FIG. 8 shows a comparison of the expected disparity versus object-lens distance. The disparity on the y-axis is given in units of pixels for two different pixel sizes of 3.5 μm and of 1.5 μm. Object-lens distances "z" from zero meter to 5 meter are shown on the x-axis in units of meter. The expected disparity is calculated by using the following values, which may resemble a ToF camera such as used in a today's smartphone:

Focal length f=3.9 mm
Lens focused at infinity (i.e. $z_0^{-1}=0$ in equation 3)
f/#=1.6
Aperture radius=1.21 mm (=baseline B)
ToF pixel size: 7 um (3.5 um PD size: "p_size=3.5 [μm]")
vs. 3 μm (1.5 um PD size: "p_size=1.5 [μm]")

As a rule of thumb known in the art, for meaningful depth estimation a disparity of ~0.5 pixel or more is required. Accordingly and with reference to FIG. 8, we expect that a meaningful depth sensing range d may be about d≤3 m for a 3 μm ToF pixel and about d≤1.5 m for a 7 μm ToF pixel. Depth sensing range d refers here to the object-lens distance of an object point. This implies that miniaturization of the ToF pixel size may be beneficial for 2PD (or 4PD) based depth map estimation. Furthermore and with reference to equation 3, a ToF camera having a larger f·B ratio may also have an increased depth sensing range d.

In some examples, techniques for stereo baseline magnification such as e.g. described by Zhou et al. in "Stereo Magnification: Learning view synthesis using multiplane images" published in [ACM Trans. Graph., Vol. 37, No. 4, Article 65. Publication date: August 2018] may be used.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. An image sensor pixel, comprising:
    a plurality of sub-pixels;
    a microlens covering the plurality of sub-pixels; and
    a read-out circuit (ROC) for extracting time-of-flight (ToF) signals of each sub-pixel individually, wherein the image sensor pixel includes a switch, wherein in one state the switch is closed so that the plurality of sub-pixels form together one pixel and the ROC reads out the one pixel for generating a ToF depth map, and wherein in another state the switch is opened so that the ROC reads out each sub-pixel individually for generating a stereo depth map.

2. The image sensor pixel of claim 1, wherein the plurality of sub-pixels includes 2 sub-pixels.

3. The image sensor pixel of claim 1, wherein the plurality of sub-pixels includes 4 sub-pixels.

4. The image sensor pixel of claim 1, wherein the image sensor pixel is a direct ToF (d-ToF) image sensor pixel.

5. The image sensor pixel of claim 1, wherein the image sensor pixel is an indirect ToF (i-ToF) image sensor pixel.

6. The image sensor pixel of claim 1, included in an image sensor of a camera having a focal length f in the range of 1.5 mm-10 mm.

7. The image sensor pixel of claim 1, included in an image sensor of a stereo camera having a baseline B in the range of 0.5 mm-50 mm.

8. The image sensor pixel of claim 1, included in an image sensor of a stereo camera having a baseline B in the range of 0.5 mm-25 mm.

9. The image sensor pixel of claim 1, included in an image sensor of a stereo camera having a baseline B in the range of 0.5 mm-10 mm.

10. The image sensor pixel of claim 1, wherein each sub-pixel has a size of 1 μm-10 μm.

11. The image sensor pixel of claim 1, included in an image sensor of a stereo camera that has a vertical or a horizontal baseline.

12. The image sensor pixel of claim 1, wherein the image sensor pixel is included in a image sensor of a stereo camera, and wherein the stereo camera is included in a mobile device.

13. The image sensor pixel of claim 12, wherein the mobile device is a smartphone.

14. A method, comprising:
    providing a time-of-flight (ToF) image sensor pixel that includes a plurality of sub-pixels, wherein the plurality of sub-pixels is covered by a microlens;
    using a read-out circuit (ROC) to read out ToF signals of each sub-pixel individually, by:
    obtaining a stereo depth map and an ToF map calculated from the ToF signals;
    analyzing the stereo depth map and the ToF depth map for assigning stereo scores to segments of the stereo depth map and for assigning ToF scores to the segments of the ToF depth map; and
    generating a fused depth map by using stereo depth map data for segments that have high stereo scores and using ToF depth map data for segments that have high ToF scores.

15. The method of claim 14, wherein the using a ROC to read out ToF signals of each sub-pixel individually includes using the ROC to read out fewer than all ToF signals generated by the plurality of the sub-pixels.

16. The method of claim 14, wherein the image sensor pixel is a direct ToF (d-ToF) image sensor pixel.

17. The method of claim 14, wherein the image sensor pixel is an indirect ToF (i-ToF) image sensor pixel.

18. The method of claim 14, wherein the 1-shot depth map is used to generate a high fps depth map stream having a fps≥35.

19. The method of claim 14, wherein the image sensor pixel is included in a image sensor of a stereo camera, and wherein the stereo camera is included in a mobile device.

20. The method of claim 19, wherein the mobile device is a smartphone.

* * * * *